US006878880B2

(12) United States Patent
King, Jr.

(10) Patent No.: US 6,878,880 B2
(45) Date of Patent: Apr. 12, 2005

(54) TWIST-ON WIRE CONNECTOR

(76) Inventor: Lloyd Herbert King, Jr., 395 Larimore Valley Dr., Chesterfield, MO (US) 63005

( * ) Notice: Subject to any disclaimer, the term of this patent is extended or adjusted under 35 U.S.C. 154(b) by 0 days.

(21) Appl. No.: 10/307,740

(22) Filed: Dec. 3, 2002

(65) Prior Publication Data

US 2004/0104039 A1 Jun. 3, 2004

(51) Int. Cl.[7] .......... H02G 3/06
(52) U.S. Cl. .......... 174/87
(58) Field of Search .......... 174/87

(56) References Cited

U.S. PATENT DOCUMENTS 1,726,991 A * 9/1929 Lundy .......... 174/87
2,199,532 A * 5/1940 Weeks .......... 310/249
2,831,446 A * 4/1958 Schwartz .......... 228/56.3
3,083,260 A * 3/1963 Bird .......... 174/87
3,550,765 A * 12/1970 Anderson .......... 174/138 F
5,113,037 A * 5/1992 King et al. .......... 174/87
5,308,922 A * 5/1994 Wallace et al. .......... 174/87
5,315,066 A * 5/1994 Spiteri, Sr. .......... 174/87

* cited by examiner

*Primary Examiner*—Chau N. Nguyen
(74) *Attorney, Agent, or Firm*—Jacobson & Johnson

(57) ABSTRACT

An on-the-go twist-on wire connector for enhancing the current carrying capacity of the electrical wires contained therein with the housing having a closed end and an open end with a wire engaging coil located in the closed end of the housing for bringing a plurality of wires into surface-to-surface contact to provide a direct surface-to-surface electrical path for flow of electrical energy therebetween. Located in the twist-on wire connector is a wire adhereable electrically conducting medium the adhereable electrical conducting medium is conformable around the plurality of wires as the plurality of wires are brought into surface-to-surface engagement with the conformable electrical conducting medium thereby forming an indirect current path between the ends of the plurality of wires while retaining the on-the-go ability of the twist-on wire connector to form the electrical connection solely through twisting action.

18 Claims, 2 Drawing Sheets

TWIST-ON WIRE CONNECTOR

FIELD OF THE INVENTION

This invention relates generally to twist-on wire connectors and, more specifically, to an on-the-go twist-on wire connector having an electrically conducting medium for enhancing the current carrying capacity between the wire ends, which are located in the twist-on wire connector.

CROSS REFERENCE TO RELATED APPLICATIONS

None.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of on-the-go twist-on wire connectors for connecting the junction of two or more wires together by twisting a housing around the ends of wires is old in the art. Twist-on wire connectors are well known in the art and generally comprise an outer open end housing with a tapered threaded interior, such as a spiral thread, to permit a user to insert wires into the tapered threaded interior. To use a twist-on wire connector, the user inserts the ends of electrical wires into the spiral threaded cavity on the inside of the wire connector. The user then holds the wires in one hand and with the other hand twists the wire connector. The twisting action pulls the wire ends into a low resistance electrical contact with each other in one continuous motion without the need for special tools.

If the twist-on wire connector is located in a wet location it is necessary to place a waterproof sealant around the wire connector. In order to prevent water or moisture from entering the connector and forming an oxidation layer over the ends of the wire, the user can insert the entire wire connector or at least the wire ends into some type of a waterproof potting compound. The compound may be either a non hardening or a hardening compound. In either case the compound creates a waterproof capsule over the junction ends of the electrical wires.

The prior art process is time consuming because it involves two separate steps as well as the nuisance of having separate potting compounds and containers to hold the potting compound.

A second generation improved twist-on wire connector exits where the wires can be encapsulated and sealed in a twist on wire connector to prevent water or moisture from entering the connector and is shown in my U.S. Pat. Nos. 5,113,037; 5,023,402 and 5,151,239. The second generation twist-on wire connectors permits the user in one continuous action to simultaneously form the junction ends of wire leads into a low resistance electrical connection that is surrounded by a waterproof sealant to form either a waterproof covering around the junction ends of the wire leads or a water-resistant covering over the ends of the electrical wires. These are two of the types of twist-on wire connectors available for use in different environmental conditions.

Under certain dynamic conditions, such as vibration and shock, or large temperature changes the wires in the twist-on wire connector can become loosened and thus lower the integrity of the connection between the wires in the twist on wire connectors by either increasing the electrical resistance or decreasing the contact area or both.

In my copending patent application U.S. Ser. No. 09/987,780 titled LOW TORQUE TWIST-ON WIRE CONNECTOR filed Nov. 16, 2002 I disclose a third generation electrical twist-on wire connector wherein the integrity of the low resistance electrical connection of the twist-on wire connector is enhanced by placing a small amount of self-adhering lubricant in the twist-on wire connector. Generally, to enhance the electrical conductivity between wires one needs only a small amount of self-adhering lubricant to provide an enhanced low resistance electrical connection. My copending application points out incorporating a small amount of a self-adhering lubricant into the twist-on wire connector results in an enhanced low resistance electrical connection between the wire ends.

In the Low Torque Twist-on Wire Connector I permit a user to form the ends of two or more wire leads into a low resistance electrical connection by having the twist-on wire connector contain a self adhering lubricant located along a portion of the interior of the twist-on wire connector. In operation of a twist-on wire connector the wires are drawn into the housing by a spiral thread through the twisting action of the wires with respect to housing. As the wires are drawn into the spiral thread, the frictional resistance to the rotation of the wires increases until the wires can no longer be hand twisted into the wire connector. With use of a lubricant on the spiral threads the wires, which are drawn into contact with the lubricant, one decreases the torque resistance for the same number of turns without the lubricant. That is, the torque resistance, which is a result of frictional resistance between the wires and the spiral thread decreases. Consequently, the torsonial resistance decrease allows the wires to be brought into further electrical contact through only hand tightening while at the same time the radially compressive forces on the wires become greater by being forced into a smaller volume thus ensuring a low resistance electrical connection that remains stable over an extending period of time. Because only a small amount of self-adhering lubricant is needed within the wire connector to provide an enhanced low-resistance electrical connection problems of the self-adhering lubricant accidentally coming into contact with the exterior housing of other twist-on wire connectors is minimized even if caps are not used on the twist-on wire connectors.

While my aforedescribed low resistance electrical connector shows one how to enhance electrical conductivity between two or more wires in a twist on wire connector without the aid of tools the current carrying capacity between the wires in a twist-on wire connector is primarily determined by the amount of surface contact area between the ends of the wires which is increased as a result of forcing the ends of the wires into a smaller volume and greater surface to surface contact. It is also known in the art to enhance electrical conductivity between the ends of wires by surrounding the electrical leads with a metal conductor such as molten solder or the like and allowing the molten solder to solidify around the ends of the wires. The use of solder or the like in twist on wire connectors is generally disliked not only because it requires additional steps and time but it also makes the connection permanent.

One of the ongoing difficulties with the field use of twist-on wire connectors is that in order not to have an inordinate number of different size twist-on wire connectors one size twist-on wire connector is used for multiple wires of different sizes. A typical twist-on wire connector generally lists usable wire combinations according to the number of wires and the size of the wires. For example, a twist-on wire connector might state the usable number of wire combinations as follows: 1 or 2 #10 wires, 1 #10 wire with 1–3 #14 wires, 1 #10 wire with 1 or 2 #12 wires, 2 #10 wires with 1 #14 wire, 1–4 #12 wires, wires, 2 #14 wires with 2–4 #16 wires, 2 #12 wires with 1–2 #14 wires, 2 #12 wires with 1 or 2 #18 wires, 2–5 #14 wires, 4–6 #16 wires or 1 #16 wire with 4 #18 wires. As a result of the number or wires used as well as the variation of size of the wires used the surface contact area between wire ends and consequently the current carrying capacity between the ends of the wires varies in accordance with the size of the wire leads as well as the number of wire leads. That is, if the contact area between the ends of the electrical wires is relatively small a greater opportunity exists for exceeding the current carrying capacity of the wire junction and overheating the junction. Conversely, if the contact area between the ends of the electrical wire is relatively large the chances of exceeding the current carrying capacity of the junction between the wires is reduced.

Still other connectors, which are used with aluminum wires have been filled with an anti-oxidant paste for the purpose of preventing the formation of an oxidation layer on the exterior surface of the aluminum wire since the aluminum oxide has high electrical resistance which can cause the junction between the wires to overheat.

The present invention provides an improved on-the-go twist-on wire connector that provides an electrical connection between the ends of wires with the electrical connection having improved current carrying capacity even when used with wires of different sizes or multiple wires and at the same time retaining the convenience of conventional twist-on wire connectors.

The present invention provides an improved on-the-go twist-on wire connector that in one embodiment contains multiple mediums, a first medium comprising an electrical conductive material that is present around the ends of the wires to enhance the current carrying capacity between the free ends of the wires and a second medium comprising a topical non-electrical conductive material separate from the first medium with the topical barrier extending over the electrical conductive material to maintain the electrical conductive material in the closed end of the twist on wire connector.

SUMMARY OF THE INVENTION

Briefly the present inventions comprises an on-the-go twist-on wire connector for enhancing the current carrying capacity of the electrical wires contained therein with the housing having a closed end and an open end with a wire engaging coil located in the closed end of the housing for bringing a plurality of wires into surface-to-surface contact to provide a direct surface-to-surface electrical path for flow of electrical energy therebetween. Located in the closed end of twist-on wire connector is a pressure deformable wire adhereable electrical conducting medium with the conformable wire adhereable electrical conducting medium conformable around the plurality of wire ends as the plurality of wire ends are brought into surface-to-surface engagement with the conformable electrical conducting medium thereby forming an indirect current path between the wire ends while retaining the on-the-go ability of the twist-on wire connector to form an electrical connection solely through twisting action.

DESCRIPTION OF THE PREFERRED EMBODIMENT

Figure 1:
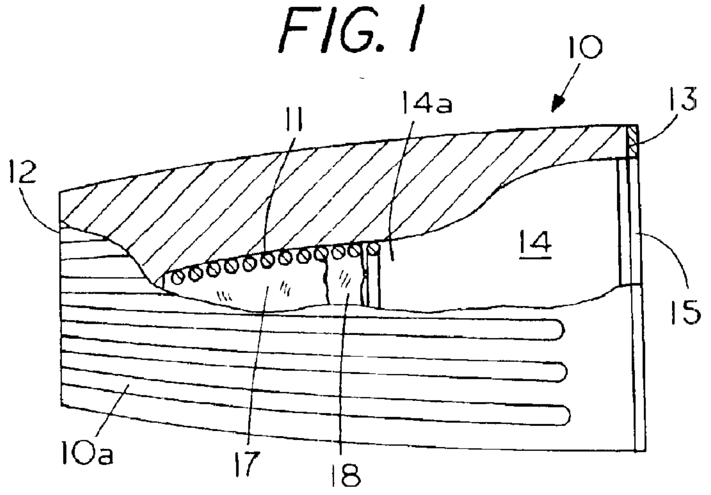
FIG. 1 is a partial cutaway view showing a twist-on wire connector with two mediums located therein.

FIG. 1 is a partial cutaway view showing an on-the-go twist-on wire connector 10 having an exterior surface with a plurality of longitudinally extending finger engaging recesses **10*a*. Located inside a closed end 12 of wire connector 10 is a spiral thread 11 or wire engaging coil. Located on the opposite end of twist-on wire connector 10 is a wire penetrable end 13 for penetration of wires into a chamber 14 in twist-on wire connector 10. In the embodiment shown a wire penetrable cap 15 extends over the wire penetrable end 13 with cap 15** penetrable therethrough by flexing, punching or the like. On-the-go twist-on wire connectors are noted for there ease of use since the operator merely inserts a plurality of wires into the spiral thread of the wire connector and twists the wire connector to bring the wire ends into surface to surface contact with each other to create a current path from a surface contact area of one wire end to a surface contact area of another wire end without the need for an additional step such as securing the wire ends together with solder or the like. This in situ formation of electrical connections is widely preferred since the electrical connections can be quickly made.

FIG. 1 shows the twist-on wire connector 10 in section with the converging end **14*a* of chamber 14 containing an electrically conductive wire adhereable material 17** that forms surface engagement with the electrically conducting ends of the wires inserted therein.

Extending over conductive wire adhereable material 17 is a topical barrier layer of a viscous non-electrically conductive material 18 which extends over the exposed end of the viscous electrically conductive material 17 located in the closed end of chamber 14 to form an insulating cover. The use of viscous material allows the material to be retained in the wire connector during use as well as provides a flowable or wire conformable material that permits wires to be twisted therein without forcing the material out of the connector. By use of a pressure flowable or wire conformable material that is sufficiently viscous so as not to run out of the connector one can maintain the electrically conductive material in the connector. In addition, by use of a non-hardenable material in either the electrically conductive material or the electrically non-conducting one can alter a connection to add or take out wires without having to cut the wires and restrip the wire ends.

Figure 2:
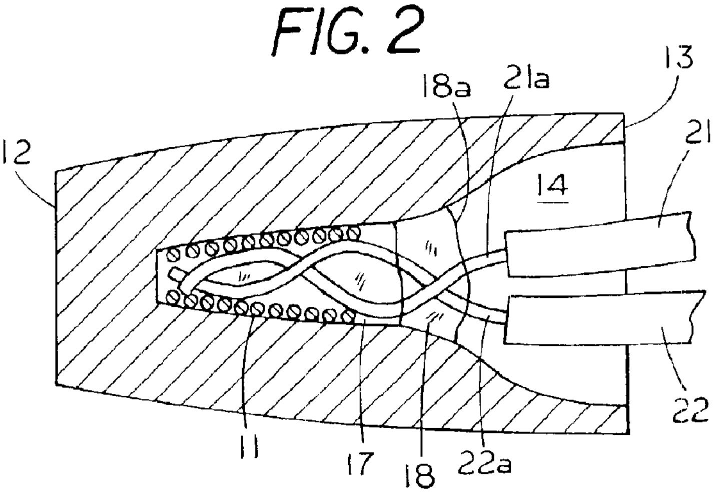
FIG. 2 is the twist-on wire connector of FIG. 1 showing two wires located in electrical communication with each other in the presence of an electrically conductive material.

In order to appreciate the operation of the present invention reference should be made to FIG. 2 which shows the twist-on wire connect 10 of FIG. 1 without a cap on the end of the wire connector.

FIG. 2 shows a first wire 21 having an exposed electrically conducting end 21*a* and a second wire 22 having an exposed electrical conducting end 22*a* that have been inserted into the wire penetrable end 13 and extended through the topical barrier layer of viscous non-electrically conductive material 18 and into the viscous electrically conductive material 17 in the closed end of the chamber 14. In the embodiment shown, the electrical conducting wire ends 21*a* and 22*a* have been twisted into a low resistance electrical connection thought the coaction of the spiral thread 11 with the ends of the wires to produce a current path from wire end to wire end by bringing portions of the surface areas of wire end 21*a* into pressure contact with portions of the surface areas of wire end 22*a*. A portion of the wire end 21*a* and 22*a* are twisted into a low resistance electrical connection to each other in the presence of a medium of the viscous electrically conductive material 17 while a further portion of the wires are maintained proximate each other in a medium of the non-electrically conductive material 18. Thus, in the embodiment shown, a path for current flow from wire end 21 to wire end 22*a* is enhanced since not only can current flow from wire end 21*a* to wire end 22*a* based on surface to surface contact between the wire ends 21*a* and 22*a* but current can also flow from wire end 21*a* to wire end 22*a* through the electrically conducting medium 17. As a result, one minimizes the opportunity for the ends of the wires in the twist-on wire connector to heat up when current flows though the ends of the wires since the increased current path due to the electrical conductive medium provides less resistance to electrical flow from wire to wire then if the electrical conductive medium were not present.

Viscous wire adhering electrical insulation materials are known in the art and have been used in twist on wire connectors such as shown in my U.S. patents U.S. Pat. Nos. 5,113,037; 5,023,402 and 5,151,239. In addition the use of an insulating material a viscous electrical conducting wire adhering material can comprise a base having electrically conductive particles such as carbon fibers or metal particles therein. Electrically conductive viscous lubricants are known in the art and are conventionally used in the bearings of equipment such as treadmills or the like in order to drain off static electrical charges created by the rotating belt.

As evident from the wire connector 10 shown in FIG. 2 by inserting a plug of flowable electrically conducting medium 17 into the wire engaging coil 11 and placing a topical barrier 18 of a flowable non-electrically conducting medium, which extends over the plug of electrically conducting medium 17, one creates a chamber condition so that when wire end 21*a* and 22*a* are inserted into the plug of electrically conductive material 17 it must first penetrate through the topical barrier of the non-electrically conductive material 18 that forms a protective insulating cap over the end of the wire ends. As shown in FIG. 2 the electrically conductive medium 17 surrounds and clings to the exposed surfaces of the wire ends 21*a* and 22*a* to form a supplemental low electrical resistance path from wire end 21*a* to wire end 22*a*. In addition, the topical barrier 18 of the non-electrical conducting medium clings to the wire ends 21*a* and 22*a* to provide a protective barrier.

Thus the present invention includes the method of forming a multi-medium encapsulated wire connection by the steps of: Placing a first wire adhereable medium in a closed end of a twist-on wire connector. Placing a second wire adhereable medium over the first wire adhereable medium. Extending a plurality of wires through the second wire adhereable medium into the first wire adhereable medium. Twisting the wires in the presence of both the first wire adhereable medium and the second wire adhereable medium to thereby form a low electrical resistance connection between the plurality of the wires in the first adhereable medium with the low resistance electrical connection comprising an electrical current path formed partly by the surface to surface contact of the ends of the wires and partly by the electrical conducting medium in surface contact with each of the plurality of wire ends. If the electrically conducting medium is flowable one can twist the wires therein and the material deformably flows around the wires without running out of the connector as the wires are twisted therein. Similarly, if the electrically insulating material is deformably flowable the insulating material flows around the wires to shield the wires from external effects without running out of the wire connector.

Figure 3:
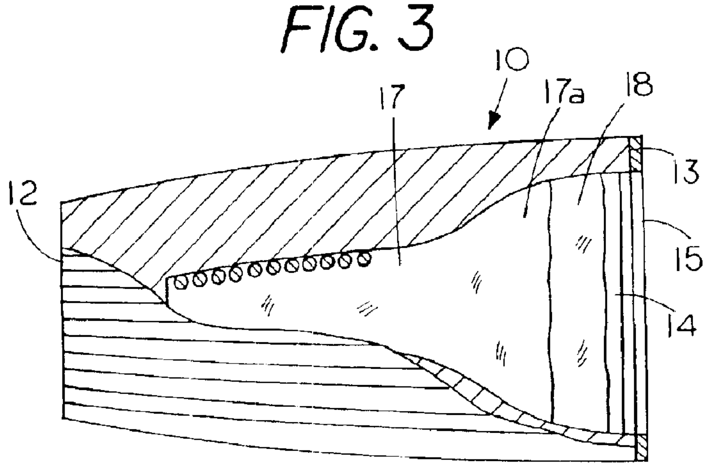
FIG. 3 is a sectional view of a twist-on wire connector substantially filled with an electrically conducting medium.

FIG. 3 shows a wire connector 10 in partial cross section. As the twist-on wire connect of FIG. 3 is identical to the twist on wire connector of FIG. 1 the numbers for identical parts are also the same. Twist-on wire connector 10 differs from the twist-on wire connector of FIG. 1 in that the plug of electrically conductive material 17 substantially fills the entire chamber 14 in connector 10. Located proximate the end face 17*a* of plug of electrically conductive material 17*a* is a topical disk like barrier of a self adhering electrically insulating material.

Figure 4:
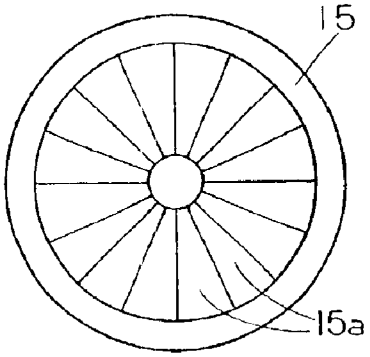
FIG. 4 shows a view of a wire penetrable cap of the wire connector of FIG. 3.

FIG. 4 shows an end view of cap 15 usable with the present invention with the cap 15 including a set of pie shaped flexible flaps 15a that project toward the center. The flaps 15*a* are sufficiently pliable so as to bend or flex inward as one inserts a wire therethrough. Generally it is preferred that the flaps contain sufficient resiliency so as to follow and engage the wire as the wire is inserted therethrough. Such caps are more thoroughly shown and described in my U.S. Pat. Nos. 5,113,037; 5,023,402 and 5,151,239 and are herein incorporated by reference.

Figure 5:
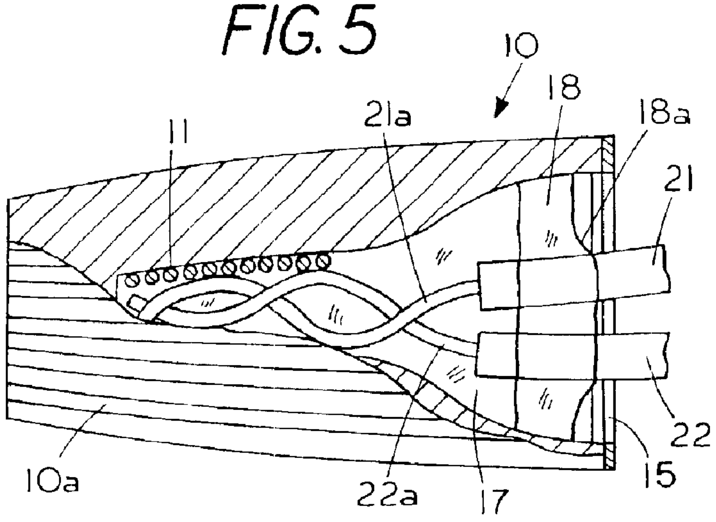
FIG. 5 shows the wire connector of FIG. 3 with two wires located in surface to surface contact as in the presence of an electrically conducting medium.

FIG. 5 shows twist-on wire connector 10 with the electrically conductive material 17 substantially filing the twist-on wire connectors and the electrical leads 21 and 22 extending through the cap 15. In this embodiment the electrical conducting wire adhering material encapsulates the exposed ends 21*a* and 22*a* of wire connector 10. The wire ends 21*a* and 22*a* are in electrical communication with each other in the presence of the electrical conducting medium 17, which in this embodiment extends partially onto the insulation covering on wires 22 and 21. The topical barrier of wire adhering medium 18 remains as a protective cover extending from side to side over the electrically conductive material and is forced outward slightly 18*a* by the volume of material occupied by the wire ends 21*a* and 22*a*. In this embodiment the twist-on wire connector contains a plug of electrically conductive material that substantially encapsulates the ends of the wires with the electrically insulating material located as a protective cover. If the wire adhering medium comprises a water proof sealant one can provide a water resistant and water proof connector. In the event that the twist-on wire connector is used in an environment not requiring insulating protection the topical layer of insulating material 18 could be eliminated.

However, in doing so one must ensure that the electrical conductive material is not forced out of the connector and thereby cause an electrical short. While different insulation values of the wire adhering medium are usable with the invention in most cases it is desirable to have non-electrically conductive material having an insulation value of at least equal to the insulated housing on the twist-on wire connector.

Figure 6:
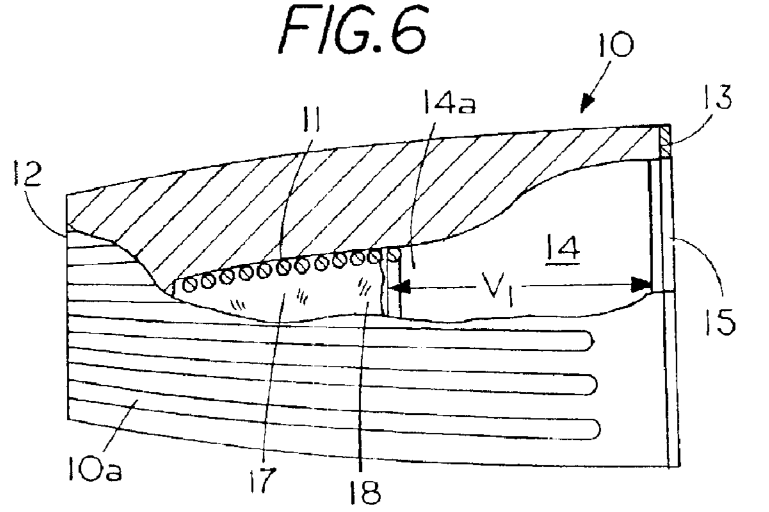
FIG. 6 shows the wire connector of FIG. 1 with conformable electrically conductive medium in the spiral thread.

FIG. 6 shows a wire connector 10 in partial cross section. As the twist-on wire connect of FIG. 6 is identical to the twist on wire connector of FIG. 1 the numbers for identical parts are also the same. In the embodiment shown in FIG. 6 a plug of electrically conductive wire adhereable material 17 is located in the closed end of the wire connector 10. In this embodiment the topical insulating layer has been dispensed with. With the use of an electrically conductive material one can rely on the cap on the wire connector to retain the electrically conductive material in the wire connector. In addition, limiting the amount of electrically conductive material such that the unfilled volume $V_1$ of chamber 14 is larger than the volume of the wire ends that are inserted into the wire connector can ensure that the electrically conductive wire adhereable material is not forced out of the twist-on wire connector during the on-the-go formation of an electrical junction between the wire ends in the wire connector. Consequently, with sufficient unfilled volume one can use a twist-on wire connector without a cap or without a topical insulating layer.

I claim:

1. A multi-medium twist-on wire connector comprising;

a housing, said housing having a closed end and a wire penetrable end;

a spiral thread located in the closed end of said housing, said spiral thread having a chamber therein;

a viscous electrically conductive material located in a closed end of the housing;

a topical barrier layer of a viscous non-electrically conductive material having a minimum thickness of at least 20 percent of a length of the twist-on wire connector extending over an exposed face of the viscous electrically conductive material so that when a plurality of wires are inserted into the wire penetrable end and extended through the topical barrier layer of viscous non-electrically conductive material and into the viscous electrically conductive material in the closed end of the chamber and are the twisted, a portion of the wires are twisted into a low resistance electrical connection to each other in the presence of a medium of the viscous electrically conductive material while a further portion of the wires are maintained proximate each other in a medium of the non-electrical conductive material.

2. The multi-medium twist-on wire connector of claim 1 including a wire penetrable cap located over the wire penetrable end of the housing.

3. The multi-medium twist-on wire connector of claim 1 wherein the electrically conductive material has an electrically conductive of at least equal to the electrical conductive of the plurality of wires therein.

4. The multi-medium twist-on wire connector of claim 1 wherein the non-electrically conductive material has an insulation value of at least equal to the insulation value of the housing on the twist-on wire connector.

5. The multi-medium twist-on wire connector of claim 1 wherein the electrical conductive material comprises metal particles suspended in a base material.

6. The multi-medium twist-on wire connector of claim 1 wherein the viscous non-electrically conductive material is a water proof sealant.

7. The multi-medium twist-on wire connector of claim 1 wherein the topical barrier layer extends in a side-to-side condition on the spiral thread.

8. The multi-medium twist-on wire connector of claim 1 wherein the viscous electrically conductive material contains electrically conducting particles therein.

9. A multi-medium twist-on wire connector comprising:

a housing, said housing having a closed end and a wire penetrable end;

a spiral thread located in the closed end of said housing, said spiral thread having a chamber therein;

a viscous electrically conductive material located ion a closed end of the housing;

a topical barrier layer of a viscous non-electrically conductive material wherein a volume of the topical barrier comprises less than 10% by volume of a volume of the viscous electrically conductive material in the closed end of the chamber with the topical barrier extending over an exposed face of the viscous electrically conductive material so that when a plurality of wires are inserted into the wire penetrable end and extended through the topical barrier layer of viscous non-electrically conductive material and into the viscous electrically conductive material in the closed end of the chamber and are then twisted, a portion of the wires are twisted into a low resistance electrical connection to each other in the presence of a medium of the viscous electrically conductive material while a further portion of the wires are maintained proximate each other in a medium of the non-electrical conductive material.

10. The multi-medium twist-on wire connector of claim 9 wherein the viscous topical barrier comprises a moisture repellent barrier.

11. The multi-medium twist-on wire connector of claim 9 wherein the topical barrier of viscous non-electrically conductive material is located at the wire penetrable end of the twist-on wire connector.

12. The multi-medium twist-on wire connector of claim 9 wherein the topical barrier of viscous non-electrically conductive material is located at the wire penetrable end of the twist-on wire connector.

13. The multi-medium twist-on wire connector of claim 9 wherein the wire penetrable cap comprises a set of radially inward extending flexible members.

14. An on-the-go multi-medium twist-on wire connector comprising:

a housing having a closed end and an open end;

a wire engaging coil located in the closed end of the housing;

a plug of a non-liquid electrically conducting material located in the wire engaging coil;

a topical barrier of a non-electrically conducting material forming a pierceable wire conformable covering extending over the plug of electrically conducting material so that when a plurality of wires are inserted into the plug of electrically conductive material they must first penetrate through the topical barrier of the non-electrically conductive material; and a wire penetrable end cap wherein the non-electrically conductive material is located proximate the wire penetrable cap and the electrically conductive material is located at the closed end so only the non-electrically conductive material is forcible out of the twist-on wire connector during the rotational engagement of a plurality of electrical wires into electrical contact in the wire engaging coil.

15. The multi-medium twist-on wire connector of claim 14 wherein the non-electrical conductive material comprises a water-repellent material.

16. The multi-medium twist-on wire connector of claim 14 wherein the wire engaging coil comprises an electrical conducting metal and a plug of non-electrically conductive material fills conformable fills the wire engaging coil.

17. A multi-medium twist-on wire connector comprising:

a housing having a closed end and an opened end;

a wire engaging coil located in the closed end of the housing;

a plug of electrically conducting material located in the wire engaging coil;

a topical barrier of a non-electrically conducting material extending over the plug of electrically conducting material so that when a plurality of the wires are inserted into the plug of electrically conductive material they must first penetrate through the topical barrier of the non-electrically conductive material where twist-on wire connector contains a chamber with an unfilled volume with the unfilled volume greater than a volume of the plurality of wires to be held in the wire connector to inhibit either of the mediums from being forced from the twist-on wire connector during the forming of an electrical junction between the plurality of wires.

18. An on-the-go twist-on wire connector for enhancing the current carrying capacity of the electrical wires contained therein comprising:

a housing having a closed end and an open end;

a wire engaging coil located in the closed end of the housing for bringing a plurality of wires into surface-to-surface contact to provide a direct surface-to-surface electrical path for flow of electrical energy therebetween with the improvement comprising: an adhereable electrically conductive medium located in the wire connector, said adhereable electrical conductive medium conformable around the plurality of wires as the plurality of wires are brought into surface-to-surface engagement with the conformable electrical conducting medium thereby forming a supplemental electrical current path between the plurality of wires while retaining the ability the twist-on wire connector to form an electrical connection solely through a twisting action of the wire connector with respect to the plurality of wires; said adhereable electrically conductive medium occupies a portion of a volume of a chamber in the wire connector such that an unfilled volume $V_1$ of the chamber is larger than a volume of the plurality of wires that are inserted into the wire connector to ensure that the adhereable electrically conductive medium is not forced out of the twist-on wire connector during the on-the-go formation of an electrical junction between the plurality of wires in the wire connector.

* * * * *